United States Patent [19]

Snyder

[11] Patent Number: 5,683,238

[45] Date of Patent: Nov. 4, 1997

[54] METHOD FOR OPERATING A FURNACE

[75] Inventor: William Joseph Snyder, Ossining, N.Y.

[73] Assignee: Praxair Technology, Inc., Danbury, Conn.

[21] Appl. No.: 639,682

[22] Filed: Apr. 29, 1996

Related U.S. Application Data

[63] Continuation-in-part of Ser. No. 245,408, May 18, 1994.

[51] Int. Cl.$^6$ .......................................................... F23C 5/00
[52] U.S. Cl. ............................... 431/8; 431/174; 431/178
[58] Field of Search ............................... 431/8, 174, 178, 431/179

[56] References Cited

U.S. PATENT DOCUMENTS

| | | | |
|---|---|---|---|
| 3,746,498 | 7/1973 | Stengel | 431/4 |
| 3,890,084 | 6/1975 | Voorheis et al. | 431/10 |
| 3,914,091 | 10/1975 | Yamagishi et al. | 431/10 |
| 4,061,487 | 12/1977 | Kiyonaga | 65/135 |
| 4,378,205 | 3/1983 | Anderson | 431/5 |
| 4,403,941 | 9/1983 | Okiura et al. | 431/10 |
| 4,405,587 | 9/1983 | McGill et al. | 423/235 |
| 4,427,362 | 1/1984 | Dykema | 431/4 |
| 4,907,961 | 3/1990 | Anderson | 431/8 |
| 4,973,346 | 11/1990 | Kobayashi | 65/135 |
| 5,076,779 | 12/1991 | Kobayashi | 431/5 |
| 5,147,438 | 9/1992 | Castelain et al. | 65/135 |
| 5,199,866 | 4/1993 | Joshi et al. | 431/353 |
| 5,209,656 | 5/1993 | Kobayashi et al. | 431/187 |
| 5,242,296 | 9/1993 | Tuson et al. | 431/10 |
| 5,256,058 | 10/1993 | Slavejkov et al. | 431/187 |
| 5,267,850 | 12/1993 | Kobayashi et al. | 431/8 |
| 5,387,100 | 2/1995 | Kobayashi | 431/8 |
| 5,584,684 | 12/1996 | Dobbeling et al. | 431/8 |

*Primary Examiner*—Carroll B. Dority
*Attorney, Agent, or Firm*—Stanley Ktorides

[57] ABSTRACT

A method for operating a furnace comprising generating NOx at a first NOx generation rate by combustion at a distance from the flue of the furnace and generating NOx at a second NOx generation rate, which is less than the first NOx generation rate, by combustion closer to the flue, and thereafter passing the NOx through the interior of the furnace to and through the flue while both the NOx generated by the first rate and the NOx generated by the second rate dynamically progress toward equilibrium.

6 Claims, 2 Drawing Sheets

METHOD FOR OPERATING A FURNACE

This is a Continuation-in-Part of prior U.S. application Ser. No. 08/245,408 filing Date: May 18, 1994.

TECHNICAL FIELD

This invention relates generally to the operation of furnaces and more particularly to the reduction of nitrogen oxides (NOx) emitted from a furnace.

BACKGROUND ART

Many industrial processes employ furnaces wherein fuel and oxidant are combusted to generate heat which is used to heat a charge within the furnace. Among such industrial processes one can name glassmaking wherein the charge is glassmaking materials or molten or solid glass, steelmaking wherein the charge is steel or iron, and aluminum melting wherein the charge is aluminum ingots or scrap.

Nitrogen oxides are a significant pollutant generated during combustion and it is desirable to reduce their generation in carrying out combustion. It is known that combustion may be carried out with reduced NOx generation by using technically pure oxygen or oxygen-enriched air as the oxidant as this reduces the amount of nitrogen provided to the combustion reaction on an equivalent oxygen basis. However, the use of an oxidant having a higher oxygen concentration than that of air causes the combustion reaction to run at a higher temperature and this higher temperature kinetically favors the formation of NOx.

It is known that different burners and burner systems will, in operation, generate NOx at different rates. For example, all other things being equal, combustion using a concentric burner arrangement will generally result in greater NOx formation than will combustion using a staged burner arrangement. Accordingly, in a furnace employing a plurality of burners, one may reduce NOx emissions from the furnace by replacing one or more of the high NOx burners (concentric design) with low NOx burners (staged design). However, such a conversion is costly and it is desirable to reduce the number of burners in a multiburner furnace which must be converted from high NOx to low NOx.

Accordingly, it is an object of this invention to provide a method for operating a furnace which can minimize the number of low NOx burners used for any particular target level of NOx emissions from the furnace.

SUMMARY OF THE INVENTION

The above and other objects, which will become apparent to one skilled in the art upon a reading of this disclosure, are attained by:

A method for operating a furnace having a flue to reduce the level of NOx emitted from the flue comprising:

(A) combusting fuel and oxidant in a first combustion reaction wherein NOx is generated at a first NOx generation rate and provided into the furnace;

(B) combusting fuel and oxidant in a second combustion reaction wherein NOx is generated at a second NOx generation rate, which is less than the first NOx generation rate, and provided into the furnace nearer to the flue than the NOx generated by said first combustion reaction; and (C) passing NOx generated by said first and second combustion reactions out from the furnace through the flue.

As used herein the term "flue" means a passage capable of passing furnace gases out from a furnace, generally to the ambient atmosphere.

As used herein the term "equilibrium value" means the concentration of nitric oxide plus nitrogen dioxide that would result if the concentration of nitrogen and oxygen in the furnace combustion products were held at the furnace gas temperature for an infinite period of time. Those skilled in the art are familiar with how to calculate equilibrium values using published equilibrium constants.

As used herein the term "high NOx burner" means a burner which carries out a combustion reaction wherein NOx is generated above the equilibrium value. Examples of high NOx burners can be found in U.S. Pat. No. 5,267,850 and U.S. Pat. No. 5,256,058.

As used herein the term "low NOx burner" means a burner which carries out a combustion reaction wherein NOx is generated below that of a high NOx burner and can be generated below the equilibrium value. Examples of low NOx burners can be found in U.S. Pat. No. 4,378,205, U.S. Pat. No. 4,907,961 and U.S. Pat. No. 5,209,656.

As used herein the terms "nitrogen oxides" and "NOx" mean the sum of nitric oxide (NO) and nitrogen dioxide ($NO_2$).

DETAILED DESCRIPTION

Figure 1:
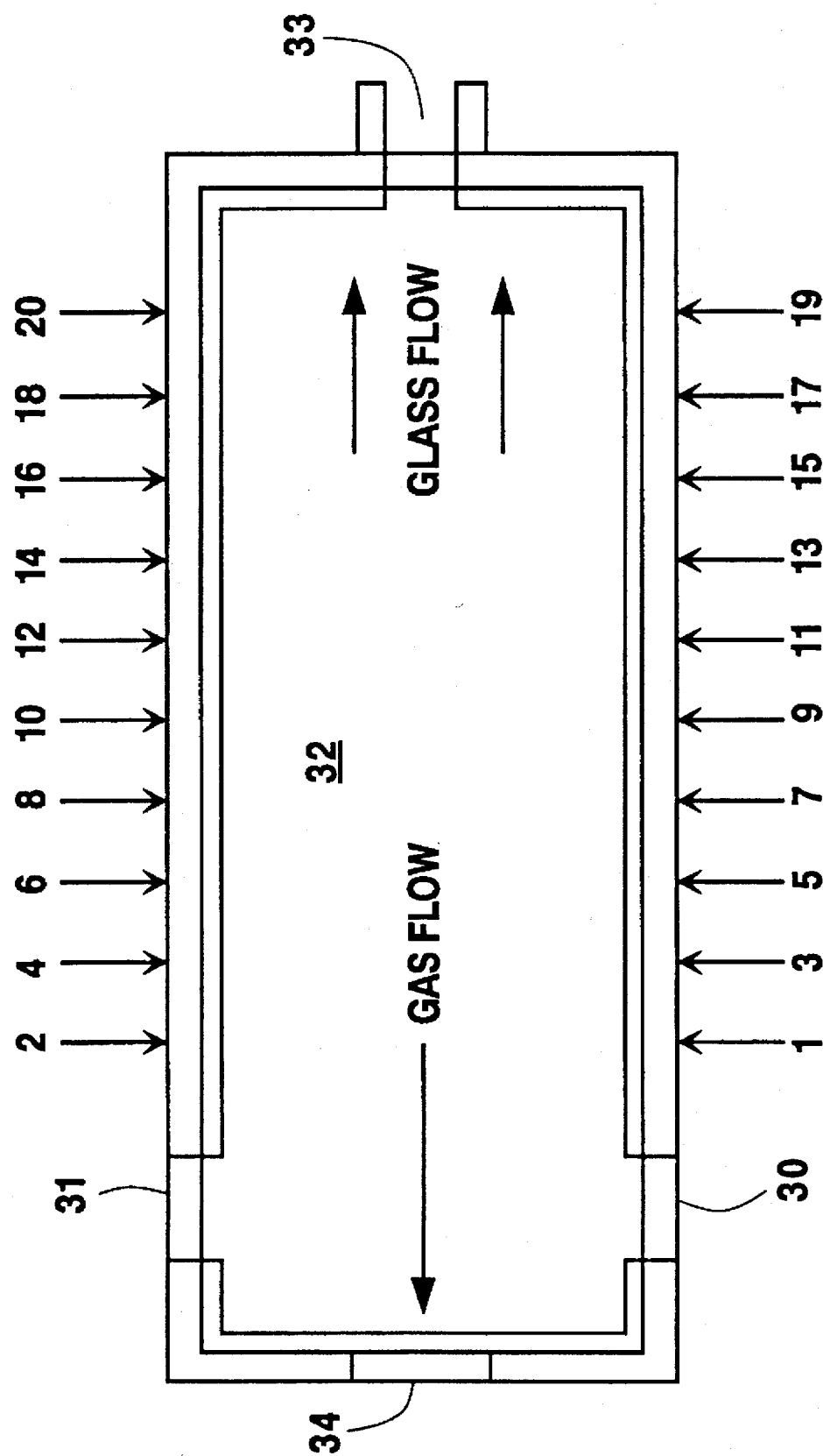
FIG. 1 is a simplified plan view representation of one furnace which may be used in the practice of the invention.

The invention comprises the recognition that the NOx level generated in a furnace combustion reaction is not static within the furnace but rather is dynamic within the furnace and, furthermore, that the nonstatic condition is in the direction toward the equilibrium value. The longer the combustion reaction gases from a combustion reaction remain in a furnace, the closer to the NOx equilibrium value they will come prior to exiting the furnace through the flue. The rate at which the gases approach the equilibrium value depends on the temperature of the furnace. Higher temperatures produce faster rates hence the invention achieves the best results when the furnace temperature exceeds 2700° F.

In a multiburner furnace the level of NOx emitted from the flue may be disproportionately reduced by the practice of the invention over that which is achieved by the mere replacement of one or more high NOx burners with low NOx burners. If a low NOx burner is positioned in the furnace at a significant distance from the flue and it generates NOx levels below the equilibrium value, the furnace gases resulting from the combustion will have a long residence time within the furnace as they proceed toward the flue, and this long residence time will result in an increase in the level of NOx as the below equilibrium value of the NOx generated by the combustion dynamically progresses toward the equilibrium value. Moreover, if a high NOx burner is positioned in the furnace near the flue, the furnace gases resulting from the combustion will have a short residence time within the furnace which will not allow for a significant NOx reduction. However, if a high NOx burner is positioned in the furnace at a significant distance from the flue, the furnace gases resulting from the combustion will have a long residence time within the furnace as they proceed toward the flue, and this long residence time will result in a decrease in the level of NOx as the above equilibrium value of the NOx generated by the combustion dynamically progresses toward the equilibrium value. The dynamic progression, either an increase or decrease, toward the equilibrium value does not continue appreciably outside the furnace zone because it is the furnace conditions of heat, fluid flows and reactant concentrations which cause the dynamic progression toward equilibrium to take place. The gas cools quickly in the flue and hence the rate at which NOx levels change slows to an insignificant value near zero. In addition the residence time in the flue is very short due to its much smaller volume than the furnace.

The fuel useful in the practice of this invention may be any gas or other fuel which contains combustibles which may combust in a furnace or combustion zone. Among such fuels one can name natural gas, coke oven gas, propane, methane, oil and pulverized coal.

The oxidant useful in the practice of this invention is any fluid containing sufficient oxygen to combust with fuel in a furnace or combustion zone. The oxidant may be air. Preferably the oxidant is a fluid having an oxygen concentration of at least 30 volume percent oxygen, most preferably at least 90 volume percent oxygen. The oxidant may be technically pure oxygen having an oxygen concentration of 99.5 percent or more.

The furnace which may be used in the practice of this invention is generally an industrial furnace. The invention will have particular utility in the operation of a glassmaking furnace due to the high temperatures involved. A furnace includes burner ports wherein a burner may be placed and wherein some of all of the combustion may take place.

The invention will be described in greater detail with reference to the Figures and the following examples and comparative examples. The examples are presented for illustrative purposes and are not intended to be limiting.

Referring now to FIG. 1, there is shown in simplified form glassmelting furnace 32 where glassmaking material is passed into the furnace through charger ports 30 and 31. The glassmaking materials pass through the furnace from left to right as indicated by the glass flow arrows and in doing so are melted by heat from combustion carried out by burners 1–20 Which are shown in representative form by the arrows. The melted glass passes out from the furnace through throat passage 33. The combustion reaction gases flow above the glassmaking materials in the opposite direction as indicated by the gas flow arrow and out of furnace 32 through flue 34.

A furnace similar to that illustrated in FIG. 1 was operated with all twenty burners being high NOx burners of the type illustrated in U.S. Pat. No. 5,267,850. The fuel used was natural gas and the oxidant used was a fluid comprising 93 mole percent oxygen. The burners each generated NOx in a first combustion reaction at a first NOx generation rate of 0.30 lb/million BTU of fuel heating value. The NOx generation rate equilibrium value was 0.21 lb/million BTU. The NOx emissions were measured at the flue and found to be 1.43 lb NOx/ton glass.

Burner numbers 1–12 were changed to low NOx burners using natural gas as fuel and a fluid comprising 93 mole percent oxygen as oxidant and the furnace was again operated to produce molten glass. The low NOx burners each generated NOx in a second combustion reaction at a second NOx generation rate of 0.067 lb/million BTU. The NOx generation rate equilibrium value was 0.21 lb/million BTU. Based on laboratory results of the operation of the two different burners, it was expected that the replacement of 12 of the 20 high NOx burners with low NOx burners would reduce the NOx emissions at the flue by 45 percent. However, when the invention was actually carried out, the measured NOx emissions at the flue were only 0.5 lb NOx/ton glass, a 65 percent reduction.

Figure 2:
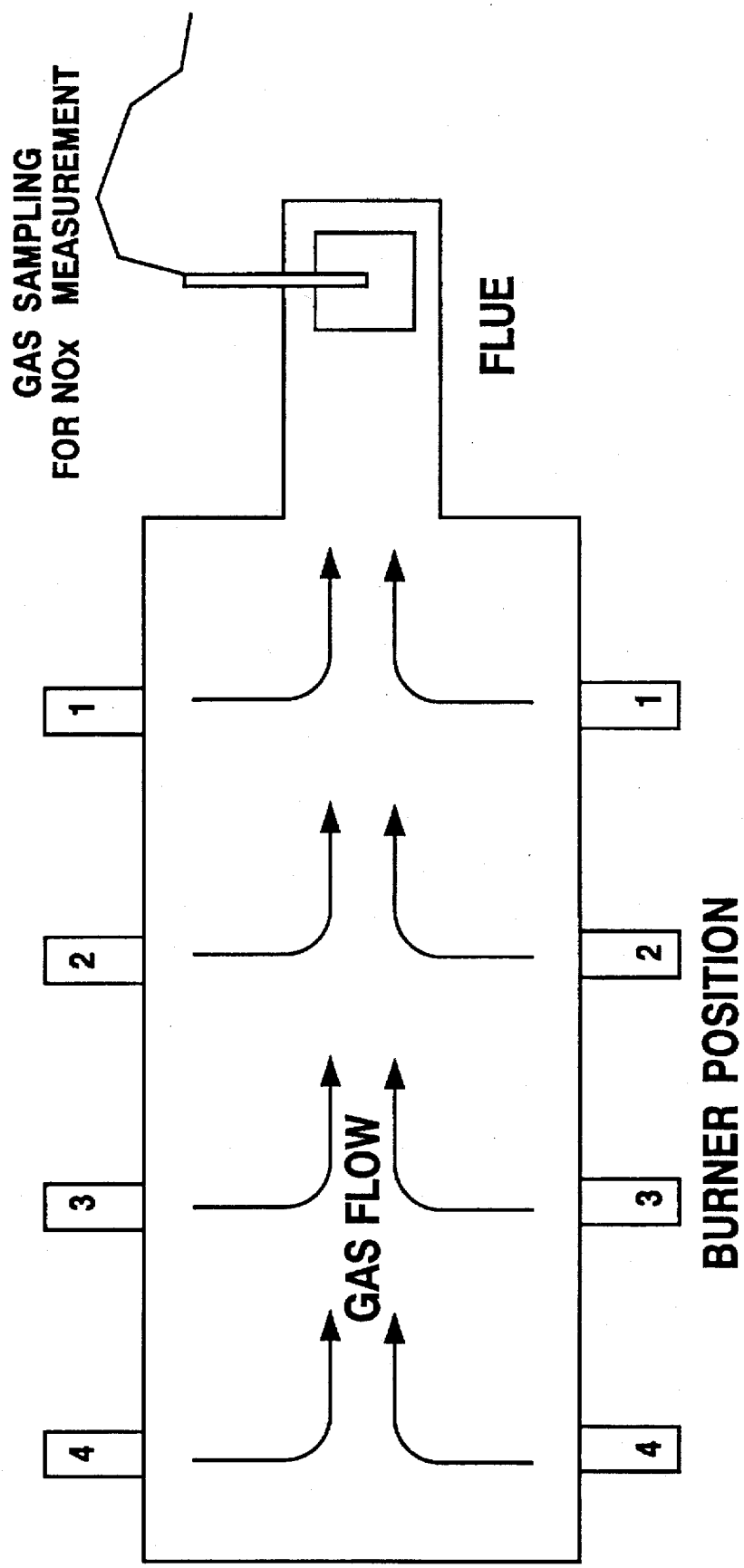
FIG. 2 is a simplified plan view representation of a furnace used to carry out some examples of the invention reported herein.

A calculated example using a furnace as represented in FIG. 2 is presented to further exemplify the invention and also produce further comparative examples. Referring now to FIG. 2, burners located at positions identified as 3 and 4 each combust fuel and oxidant in a first combustion reaction and each generate NOx at a first NOx generation rate of 0.406 lb/million BTU while burners located at positions identified as 1 and 2 each combust fuel and oxidant in a second combustion reaction and each generate NOx at a second NOx generation rate of 0.074 lb/million BTU. The equilibrium value for each case is 0.169 lb/million BTU. The NOx measurement at the flue, as illustrated in FIG. 2, is 0.843 lb/million BTU. For comparative purposes the experiment is repeated except that the burner positions are reversed, i.e. the burners located at positions 3 and 4 each generate NOx at a rate of 0.074 lb/million BTU and the burners located at positions 1 and 2 each generate NOx at a rate of 0.406 lb/million BTU. The NOx measurement at the flue is 0.936 lb/million BTU, an 11 percent increase in NOx at the flue from that achieved with the practice of the invention. This example and comparative example clearly demonstrate the advantageous results attainable with the practice of this invention. The invention identifies and advantageously employs the dynamic progression toward equilibrium of NOx provided into a furnace by a combustion reaction as the NOx passes through the furnace toward the flue and out of the furnace through the flue. This results in less NOx passed through the flue and into the ambient atmosphere than would be the case with conventional practice.

Preferably, in the practice of this invention, both the first combustion reaction and the second combustion reaction are carried out under stoichiometric conditions, i.e. within about 5 percent of exact stoichiometric conditions.

Heretofore it has been conventional practice to employ one type of burner throughout a multiburner furnace. If conditions required a burner changeover, typically all of the burners were changed. The invention employs an unconventional arrangement wherein two different burner types are used in a multiburner furnace. Moreover, by the practice of this invention, one can attain a greater degree of NOx reduction for any given level of burner conversion from high NOx to low NOx in the operation of a multiburner furnace than would otherwise be possible. Although the invention has been described in detail with reference to certain preferred embodiments, those skilled in the art will recognize that there are other embodiments of the invention within the spirit and the scope of the claims.

I claim:

1. A method for operating a furnace having a flue to reduce the level of NOx emitted from the flue comprising:

(A) combusting fuel and oxidant in a first combustion reaction under stoichiometric conditions wherein NOx is generated at a first NOx generation rate and provided into the furnace;

(B) combusting fuel and oxidant in a second combustion reaction under stoichiometric conditions wherein NOx is generated at a second NOx generation rate, which is less than the first NOx generation, rate, and provided into the furnace nearer to the flue than the NOx generated by said first combustion reaction; and (C) passing NOx generated by said first and second combustion reactions out from the furnace through the flue.

2. The method of claim 1 wherein there is carried out a plurality of first combustion reactions.

3. The method of claim 1 wherein there is carried out a plurality of second combustion reactions.

4. The method of claim 1 wherein there is carried out a plurality of first combustion reactions and a plurality of second combustion reactions.

5. The method of claim 1 wherein the furnace is a glassmaking furnace.

6. The method of claim 1 wherein the temperature within the furnace exceeds 2700° F.

* * * * *